Oct. 20, 1959
C. A. DUBBERLEY
2,909,719
MOTOR PROTECTIVE MEANS
Filed Dec. 17, 1958
FIG. 1
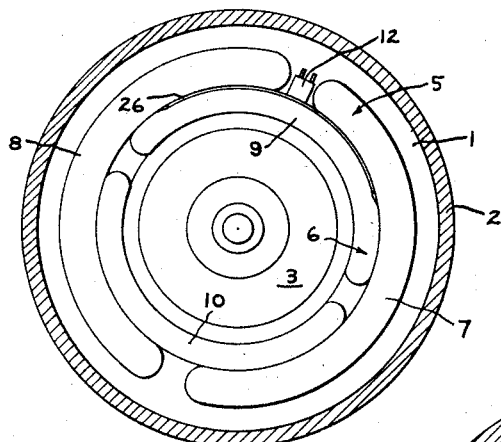
FIG. 2
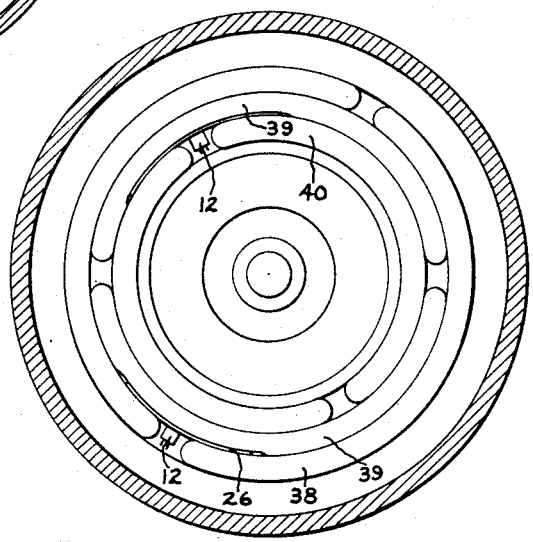
FIG. 3
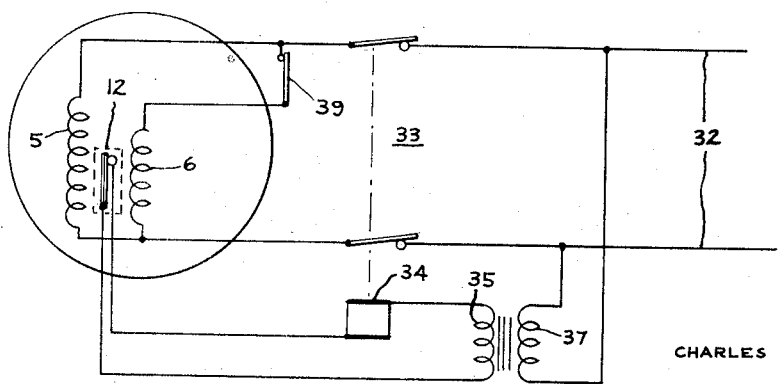
FIG. 4
INVENTOR.
CHARLES A. DUBBERLEY
BY *Walter Fule*
HIS ATTORNEY

United States Patent Office 2,909,719
Patented Oct. 20, 1959

2,909,719

MOTOR PROTECTIVE MEANS

Charles A. Dubberley, Tyler, Tex., assignor to General Electric Company, a corporation of New York Application December 17, 1958, Serial No. 781,162

3 Claims. (Cl. 318—473)

The present invention relates to motor protective means and is more particularly concerned with improved means for protecting motors against abnormally high temperature caused by excessive current conditions in or loss of heat removal from any of the windings thereof.

An object of the present invention is to provide improved thermal protection for motors of the type in which the protective means is mounted directly on the motor windings so that it responds directly to the winding temperatures.

Another object of the invention is to provide built-in thermal protection for motors employing a thermally responsive device in the form of a bimetallic element so constructed and arranged within the motor windings as to respond directly to the temperature changes of any one of a plurality of different windings in the motor.

Further objects and advantages of the present invention will become apparent as the following description proceeds and the features of novelty which characterize the invention will be pointed out with particularity in the claims annexed to and forming a part of this specification.

In accordance with the present invention there is provided a motor including a stator having winding slots therein. The motor also includes at least two separate windings each comprising a plurality of circumferentially spaced coils arranged in the slots and having end turns projecting from the slots, the windings being displaced in phase and the coils being arranged in the slots so that the end turns of the coils of one winding overlap the adjacent end turns of the coils of the other winding. A protective means in the form of a bimetal switch is provided for opening the power circuit to the motor in response to an abnormal increase in the winding temperatures and is arranged in the space between adjacent end turns of one of the windings. The switch means is encased with a hermetic casing and for the purpose of increasing the response of the switch element to winding temperatures, there is provided a metallic fin or strip having a portion in heat exchange relationship with or preferably secured to the metal casing of the switch means and having other portions extending between the overlapping end turns of the two adjacent windings. The fin is electrically insulated from the adjacent windings and in a preferred form of the invention this insulation is arranged to compensate for any differences in the normal operating temperatures of the windings in order that a single bimetal switch can be employed to provide the desired protection.

For a better understanding of the invention reference may be had to the accompanying drawing in which:

Fig. 1 is a somewhat schematic sectional view of a single phase motor incorporating the protective means for the present invention;

Fig. 2 is a similar view of the three-phase motor including the present invention;

Fig. 3 is an enlarged sectional view of the protective switch means employed in the practice of the present invention; and Fig. 4 is a schematic diagram of one type of electric circuit which can be employed in the practice of the present invention.

Referring to Fig. 1 of the drawing, the invention is shown in one form as applied to a typical small motor of the single phase type comprising a stator 1 positioned within a housing 2 and a rotor 3 rotatably mounted with in the bore of the stator 1. It is to be understood that the stator includes a plurality of laminations of the usual type provided with a plurality of spaced slots (not shown) for receiving the turns of the stator windings 5 and 6. In this type of motor the windings 5, forming the main or running winding for the motor, are in the form of two coils 7 and 8 forming opposed poles on the stator, only the end turns of these coils being shown in the drawing. The auxiliary or start winding 6 also comprises two coils 9 and 10 angularly displaced or displaced in phase from the coils 7 and 8. The end turns of the coils 9 and 10 are in overlapping relationship with the end turns of the coils 7 and 8, it being understood that all four of these coils are suitably retained in suitable slots provided in the stator.

In accordance with the present invention, there has been provided a thermal protective means or device which is arranged to sense the operating temperatures of both of the windings 5 and 6 so that the power circuit to the motor can be interrupted in the event of an abnormal rise in the temperature of either or both of the windings. In the embodiment of the invention, illustrated in Fig. 1, the protective means includes a hermetically sealed bimetallic switch 12 disposed in the space between the coils 7 and 8 forming the run winding for the motor. As will be seen from Fig. 3 of the drawing, the switch means comprises a sealed casing or housing 14 composed of metal or other heat conducting material and containing a bimetal element 15 in the form of a dish shaped disc positioned in close contact with the bottom of the sealed casing where it will rapidly sense the temperature of the casing. A dished bimetal disc of this type has the characteristics of remaining in one of its two limiting positions until a predetermined temperature change occurs therein when it moves with a snap action to the other or opposed limiting position in which the disc is dished in the opposite direction.

Leads 16 and 17 extend into the housing through insulated bushings 18 and 19 and one of these leads 16 supports one of the switch contacts 20. The other switch contact is carried by a spring arm 21 secured to the other lead 17. Numeral 22 indicates an electrically insulating bridging member between the element 15 and the arm 21. The contacts 20 and 21 are normally open, but are held in the closed position by the bimetal element 15. When the temperature of that element exceeds a predetermined minimum it snaps away from the button 22 the spring arm 21 to open the contacts and to remain open until the temperature sensed by the bimetal again returns to a normal or safe temperature. It is to be understood that the specific structure of this bimetal switch 12 forms no part of the invention and that various known bimetal switches may be used without departing from the scope of the present invention.

In order that the switch 12 will quickly sense the winding temperatures and to provide a thermal path for conducting heat from the more remote winding areas to the switch mechanism, a metal strip or fin 26 is placed in heat exchange relationship with the switch casing 14 and is preferably soldered or brazed thereto so that with the ends of this strip disposed between the adjacent windings, heat from these windings is quickly conducted through the strip to the switch mechanism. Preferably, as will be seen in Fig. 1 of the drawing this strip 26 extends a substantial distance between the overlapping portions of the main winding coils 7 and 8 and the coil 9 of the auxiliary winding. By this arrangement, the switch 12 is made responsive to the changing temperatures of a relatively large area of the adjacent main and auxiliary windings and since the strip 26 is sandwiched between the coils of different windings the switch will sense the temperatures of both windings and open upon an abnormally high temperature of either.

It will be understood, of course, that the entire thermal protective means is electrically insulated from the windings or coils by the usual wire and coil insulation. For example, with reference to Fig. 3, there is provided between the fin 26 and the run winding, an insulation in the form of a paper or other thin dielectric sheet 27 of sufficient thickness to provide the desired electrical insulation but insufficient to have any significant effect upon the heat conductivity or the heat flow between the winding and the fin. Since in many motors of this type one of the windings, for example, the starting winding, may attain a somewhat elevated temperature during the starting of the motor it is desirable to decrease or impede the heat transfer from the start winding to the fin 26 in order that the switch 12 will not be tripped during normal operation of the start winding. For that purpose, additional insulation illustrated as two layers of insulation indicated by the numeral 28 are provided between the fin 26 and the start winding or more specifically the coil 9. By this arrangement even though the temperature of the start winding may normally exceed the tripping temperature of the switch during the brief period when this winding is energized, the switch will not become sufficiently warm during this period to open the power circuit.

In Fig. 4 of the drawing, there is shown one type of control circuit with which the present thermal protective device may be used. The main or running and the auxiliary or start windings 5 and 6 are indicated by the same reference numerals employed in Fig. 1 and the thermostat switch 12 is indicated as being placed between these windings in thermal exchange relationship with both. Power is supplied to both windings from the power lines 32 through a relay 33 including a relay coil 34, and in the case of the auxiliary winding 6, a starting switch 39. The coil 34 is wired in series with the protective thermal switch 12 energized by means of a secondary coil 35 of the transformer 36, the primary winding 37 of the transformer being connected across the power lines 32. By this arrangement it will be seen that the switch 12 is required only to interrupt a relatively low power circuit, the current flow through that circuit being insufficient to cause any substantial heating of the thermal switch 12. During normal operation of the motor, relay 33 is closed due to the energization of the relay 34 by means of the control circuit including the secondary winding 35 of the transformer 36. So long as the temperatures sensed by the thermal switch 12 are below the operating temperatures thereof or in other words within the designed safe limits, switch 12 remains closed. However, in case of a stalled rotor, a defective start switch or other fault causing a heating of either the run or the start windings 5 and 6 to the point where the bimetal element 15 allows the contacts 20 and 21 to spring open, the resultant de-energization of the relay 34 will cause the switch means 33 to open and break the power circuit to the motor. The circuit will remain open until the protective device 12 again senses a safe operating temperature.

In Fig. 2 of the drawing there is illustrated one manner in which the present invention is applied to a three-phase motor. Preferably, in this application, one of the switches 12 is arranged so that its fin 26 is disposed between the coils forming part of the different phase windings 38 and 39 while a second is arranged between the coils of the phase windings 39 and 40. Thus, the one switch senses any abnormal increase in temperatures in either of two of the phases while the other switch is arranged to sense an abnormal increase in temperature in one of these two phases or the third phase. It will be obvious of course that these protective switches are suitably wired in a manner similar to that shown in Fig. 4 in order to break the power circuit to the three-phase motor in the event of an abnormal rise in temperature of either of the switches 12.

While specific embodiments of this invention have been shown and described, it is not desired that the invention be limited to the particular constructions shown and described and it is intended by the appended claims to cover all modifications within the spirit and scope of the invention.

What I claim as new and desire to secure by Letters Patent of the United States is:

1. A motor comprising a stator having slots therein, a first winding comprising a plurality of circumferentially spaced coils in said slots having end turns projecting from said slots, a second winding displaced in phase from said first winding and comprising a plurality of circumferentially spaced coils in said slots and having end turns projecting from said slots and overlapping the adjacent end turns of said coils of said first winding, switch means responsive to increased motor temperature for opening the power circuit to said motor, said switch means comprising a bimetal switch encased in a metallic casing and disposed between the end turns adjacent coils of one of said windings and a metallic strip in heat exchange contact with said casing and extending between the overlapping end turns of said first and second windings adjacent said casing.

2. A motor comprising a stator having slots therein, a first winding comprising a plurality of circumferentially spaced coils in said slots having end turns projecting from said slots, a second winding displaced in phase from said first winding and comprising a plurality of circumferentially spaced coils in said slots and having end turns projecting from said slots and overlapping the adjacent end turns of said coils of said first winding, said second winding normally operating at a higher temperature than the first winding, switch means responsive to increased motor temperature for opening the power circuit to said motor, said switch means comprising a normally closed bimetal switch encased in a metallic casing and disposed between adjacent end turns of one of said windings and a metallic strip in heat exchange contact with said casing and extending between the overlapping end turns of said first and second windings adjacent said casing, and insulated therefrom to control the flow of heat from said windings to said switch, the amount of insulation between said fin and said second winding being greater than the amount of insulation between said fin and said first winding.

3. A motor comprising a stator having slots therein, a main winding comprising a plurality of circumferentially spaced coils in said slots having end turns projecting from said slots, an auxiliary winding displaced in phase from said first winding and comprising a plurality of circumferentially spaced coils in said slots and having end turns projecting from said slots and overlapping the adjacent end turns of said coils of said main winding, switch means responsive to increased winding temperature for opening the power circuit to said motor, said switch means comprising a bimetal switch encased in a metallic casing and disposed between adjacent end turns of one of said windings, a metallic fin in heat exchange connection with said casing and extending between the overlapping end turns of said main and auxiliary windings adjacent said casing, and insulation between said fin and said overlapping end turns limiting the heat transfer from said windings to said switch, the amount of insulation being greater between said fin and said auxiliary winding.

No references cited.